Sept. 5, 1967        B. C. HARRIS        3,339,967
VEHICLE CAB

Filed Aug. 20, 1964            3 Sheets-Sheet 1

INVENTOR
BERT C. HARRIS

Sept. 5, 1967   B. C. HARRIS   3,339,967
VEHICLE CAB
Filed Aug. 20, 1964   3 Sheets-Sheet 2
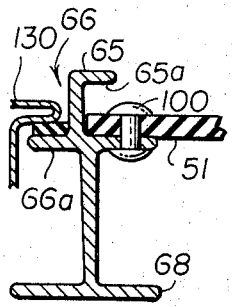
FIG. 4
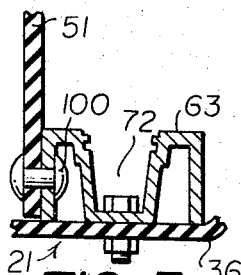
FIG. 5
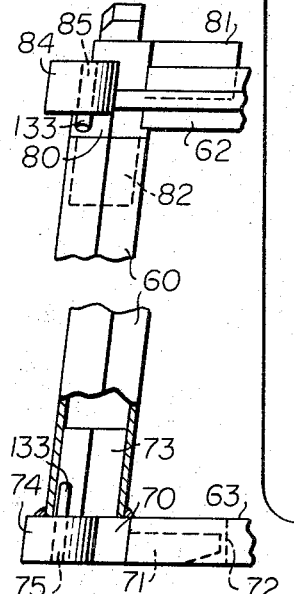
FIG. 6
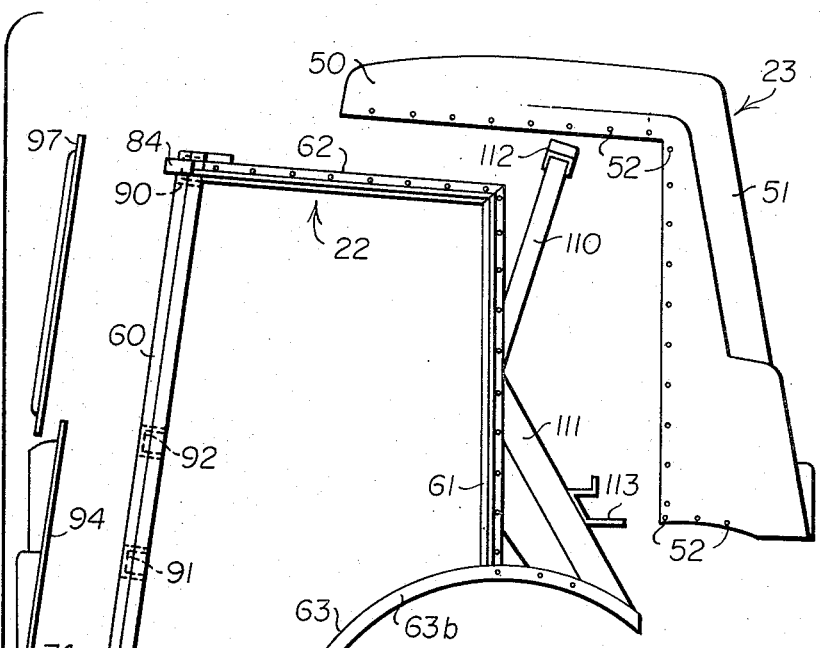
FIG. 3
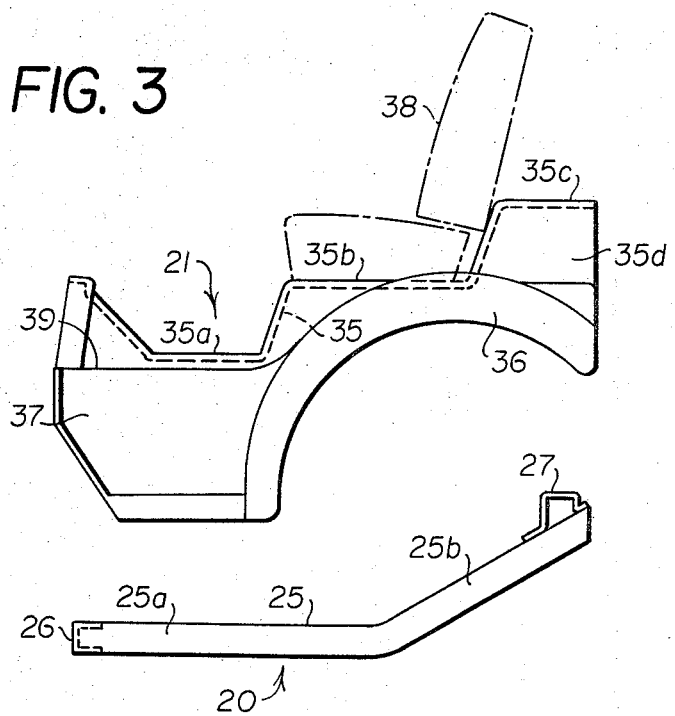
INVENTOR
BERT C. HARRIS
by Watts & Fisher, attys

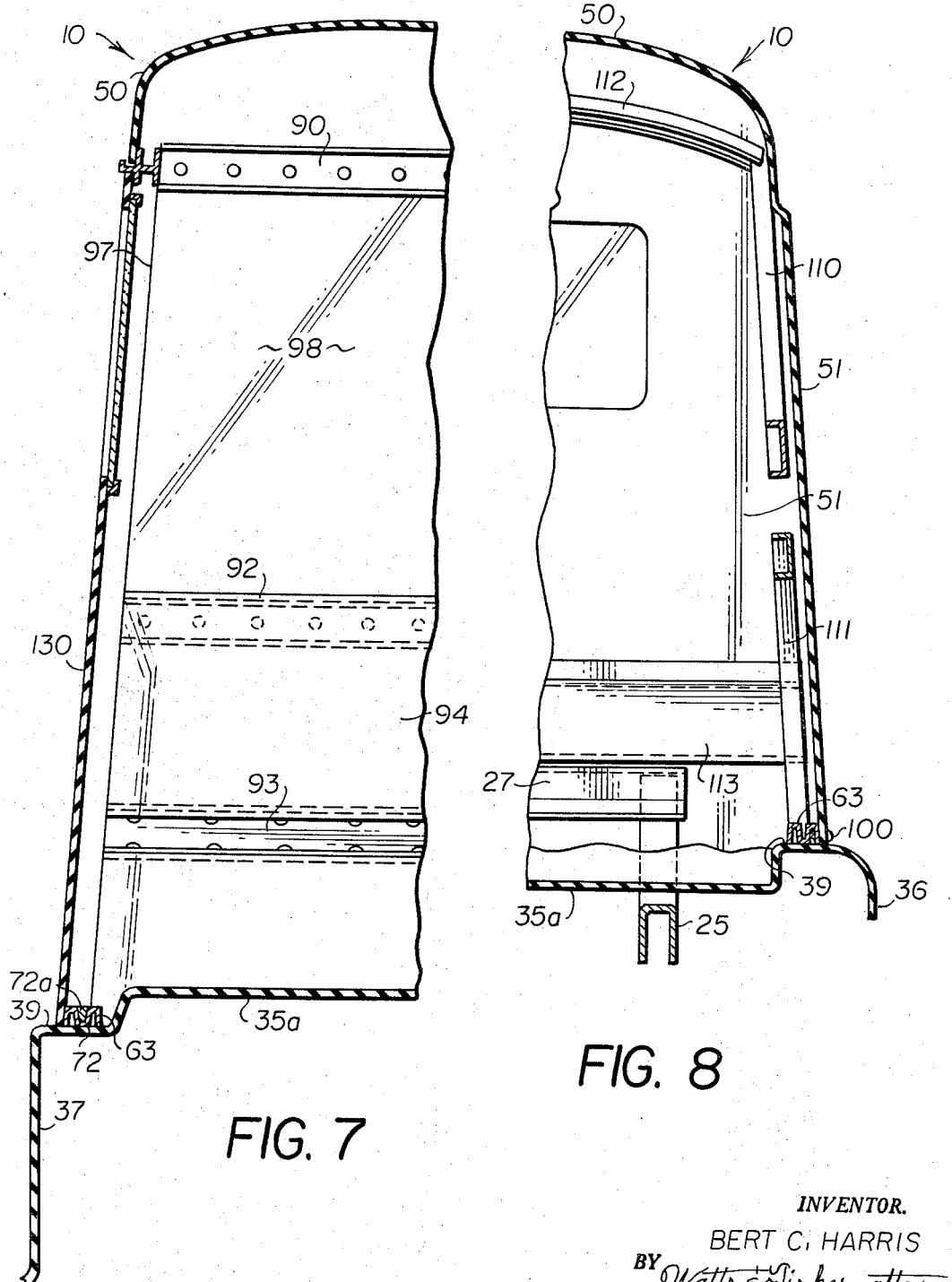

United States Patent Office 3,339,967
Patented Sept. 5, 1967

3,339,967
VEHICLE CAB
Bert C. Harris, North Olmsted, Ohio, assignor to White Motor Corporation, a corporation of Ohio
Filed Aug. 20, 1964, Ser. No. 390,904
22 Claims. (Cl. 296—28)

This invention relates to vehicle cab construction and more particularly to a truck cab construction.

In highway trucks and tractors, the permissible loading on each wheel and each axle is stringently regulated. Each pound of reduction in the weight of a truck permits one additional pound of pay load which can be legally and economically transported by a truck. Accordingly, one continuing objective of all truck designers is to minimize weight in truck construction.

Another continuing objective of truck designers is to provide a truck cab construction which is highly resistant to corrosion as from solutions resulting from the application of salt for snow removal, corrosion from industrial air pollution and the like. In truck cab construction this is perhaps a more pronounced factor than in automotive construction because (1) trucks often have life spans both in terms of miles and years which are considerably greater than automobiles, (2) trucks frequently are not washed with the regularity that careful automobile owners use, and (3) the truck cannot be left in a sheltered garage to avoid adverse weather and salt attack.

The present invention is directed to a cab construction which has great advantages over prior constructions in achieving these two objectives and which is, in addition, highly simplified and, therefore, inexpensive truck cab construction.

With this invention, molded plastic sections are formed so that the entire shell of the cab, apart from window and door structures, is composed of molded sections. One of these sections provides the entire lower wall and underside of the cab including a floor, fenders, and skirts in one section. Another of these sections is a combination roof and back section which forms both the top and the back of the cab. A third section is a front panel section disposed across the front of the cab. These three sections are tied together by a unique frame structure which, for the first time, is completely enshrouded by the skin of the cab.

The frame includes parts which form the multiple purposes of securing the molded plastic sections together, reinforcing the sections, and providing door opening framing. Since each of the body sections is a consolidation of many conventional body components in a single section, the internal frame structure is simplified as compared with prior frames. Due to its simplicity, the frame structure is unobtrusive and does not require trim. Thus, for the first time, attractive, nice appearing, interior surfaces are obtained, which surfaces are provided by the cab shell itself. The molded plastic shell makes it unnecessary for appearance or noise and thermal insulating purposes to line the cab with trimming materials. The mentioned corrosion resistant advantages are obtained because the molded plastic cab construction presents an exterior shell which is substantially inert and framing is above the floor and preferably formed of relatively corrosion resistant material.

From the preceding discussion, it will also be seen that one of the features of the invention is a lightweight and simple construction.

Accordingly, the object of the invention is to provide a novel and improved lightweight, simplified cab construction.

Other objects and a fuller understanding of the invention may be had by referring to the following description and claims taken in conjunction with the accompanying drawings in which:

FIGURE 3 is an exploded view of the cab of this invention on the scale of FIGURES 1 and 2;

Figure 1:
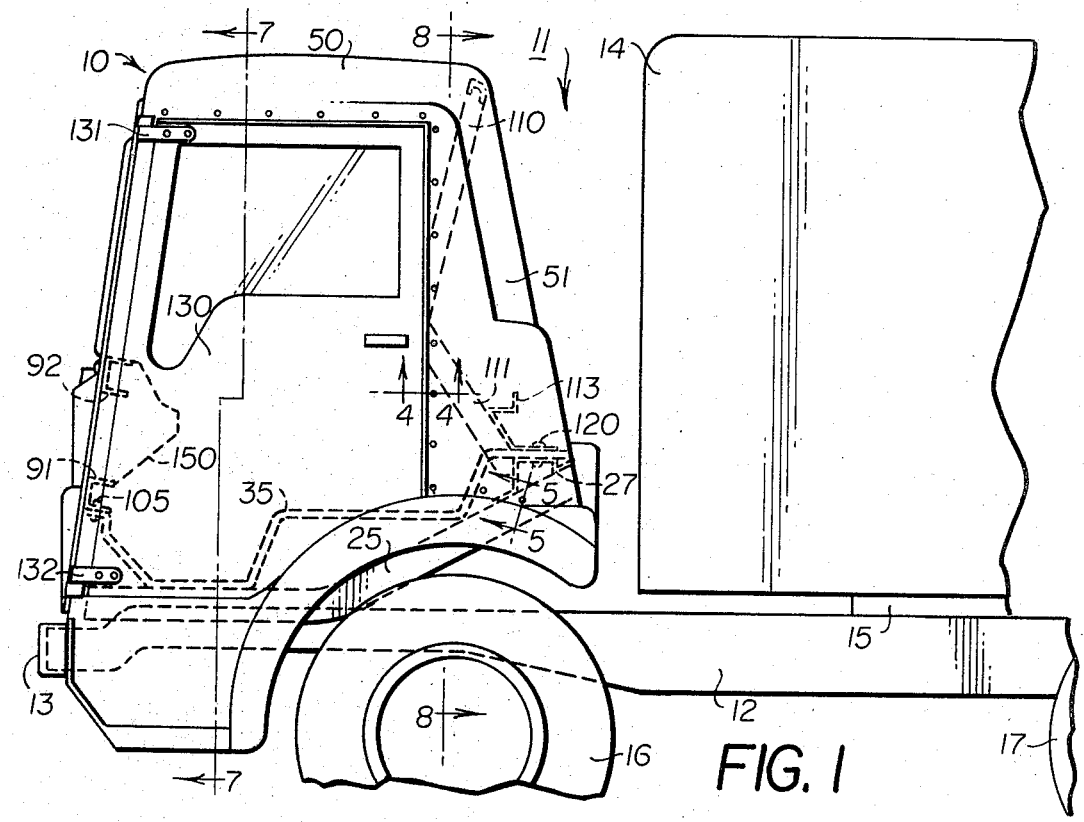
FIGURE 1 is a side elevational view of a truck incorporating the cab of this invention.

FIGURES 4 and 5 are enlarged sectional views of portions of the frame structure as seen from the planes indicated by the lines 4—4 and 5—5 of FIGURE 1;

FIGURE 6 is an enlarged foreshortened and fragmentary view of the front pillar of the frame structure and components of the frame connected to said front pillar; and FIGURES 7 and 8 are enlarged fragmentary sectional view of the cab structure as seen from the planes indicated by the lines 7—7 and 8—8 of FIGURE 1.

Figure 2:
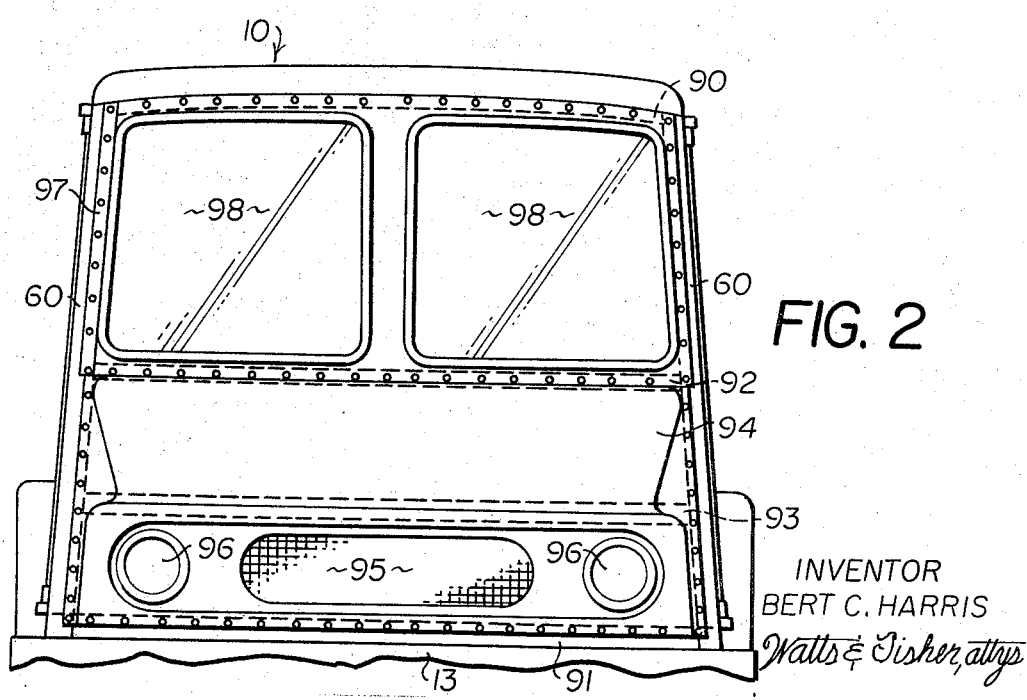
FIGURE 2 is a foreshortened front elevational view of the cab of this invention.

Referring now to the drawings, and to FIGURES 1 and 2 in particular, a truck embodying the cab construction 10 of the present invention is indicated generally by reference numeral 11. The illustrated truck 11 includes a conventional chassis which comprises a pair of longitudinal beams 12 (only one of which is shown) and a front bumper 13 bridging the forward ends of the beams 12. A cargo compartment 14 is connected to the truck chassis, as by frame structure at 15. The chassis is supported by the usual front and rear road wheels 16, 17.

As most clearly shown in FIGURE 3, the disclosed embodiment of the improved cab 10 is mounted on a tiltable cab support 20 for now conventional forward tilting of the cab for engine repair and the like. The cab 10 is formed of sub-assembly units comprising a floor section 21, door opening frames 22, a roof and back section 23, and a front panel 94.

The cab support 20 is formed by tilt bars 25 having generally horizontal forward portions 25a which are bridged by a spacer 26. The rear portions 25b of the tilt bars 25 are angled upwardly and are connected by an inverted channel spacer 27. In the truck construction chosen for purposes of illustration, the forward end of the tiltable support 20 is pivotally connected by conventional structure (not shown) to the chassis so as to permit forward tilting of the cab 10.

In accordance with the preferred embodiment of this invention, the floor section 21, the roof and back section 23 and the front panel section 94 are each of one piece construction formed of a suitable tough and lightweight plastic material. By way of example, a plastic material which has been found satisfactory is sold under the trademark "U.S. Royalite" by the United States Rubber Co. and consists of a blend of synthetic rubbers and thermoplastic resins.

These sections may be molded to a desired color, or in the alternative, painted. In either event, these sections permit, for the first time, a construction in which all sections form visible interior and exterior surfaces. Both because of the improved appearance and because of the relatively good insulating properties of the molded plastic, it is commercially acceptable to construct an unlined truck cab.

The floor section 21 is molded to define the entire lower wall of the cab including a floor panel 35 having stepped portions 35a, b, and c, fenders 36, and arcuate skirt panels 37 which are continuous with the floor panel and fenders. The floor section 21 has sill receiving surfaces 39 on either side of the floor panel 35 and inside of the fender and skirt panels 26, 27. As indicated in FIGURES 1 and 3, the floor section 21 is shaped to engage the cab support 20 forwardly and rearwardly. Thus, the floor panel portion 35a engages the channel portions 25a and the floor panel portion 35c rests on the rear spacer 27.

The cab seat 38, which is illustrated by broken lines in FIGURE 3, is secured to the floor panel portion 35b, which is, then, a seat support portion. The floor panel includes vertical side portions 35d which connect the portions 25a, b, c, to the sill surfaces 39. The provision of the integrally formed seat support, and side panel portions, and skirt portions provides rigid reinforcement for the fender and floor so that the entire floor section 21 is sufficiently strong though of molded plastic construction and without reinforcing webs, ribs, and the like. The roof and back section 23 forms a roof 50 and back wall 51 of the cab 10. As shown, the section 23 is provided with rivet holes 52 along the side edges of the roof 50 and along the side and bottom edges of the back wall 51 of the cab.

The door opening frame structures 22 are each comprised of front and rear door pillars 60, 61 respectively, a top header 62, and a cab sill 63. The cab sills 63 are shaped to engage the sill surfaces 39. When so positioned, the sills 63 are flush with the floor panel portion 35a providing a door threshold. The sill thresholds are above the skirt panels 37 which depend from the sill surfaces 39. To this end, each sill 63 is formed to include a forward threshold portion 63a, and a rear portion 63b encompassing the wheel house.

The pillars 60, 61 and the header 62 are designed to provide the shut faces of the doors. Referring to FIGURE 4, the cross section of the rear pillar 61 is shown as an example. This pillar has a projecting inverted L-shaped lip 65. The lip 65 defines a panel receiving groove 65A into which the cab section 23 projects and the lip serves as a drip molding. The lip 65 also defines one wall of an L-shaped door receiving notch 66. An arm 66A of the pillar 61 projects laterally to the left from the lip 65 to provide a shut face for door 130. The door 130 engages a gasket 67 which is carried at the shut face 66A.

An inner cross member portion 68 of the pillar 61 provided so that the pillar has a smooth internal appearance obscuring rivets 100 and contributing to a construction wherein it is not necessary to line the interior of the cab for appearance purposes.

The sill 63 has a bolt groove 72 in which connecting bolts 172 are disposed, FIGURE 5. These bolts 172 fasten the floor section 21 to the cab frame 22. A sill plug 72A is in the groove 72 in the threshold portion 62A between the pillars to conceal the bolts 172, FIGURE 7.

In the preferred construction most clearly shown in FIGURE 6, the front door pillar 60 of each frame 22 is secured to the forward end of the cab sill 63 by a pillar casting 70. The pillar casting 70 has a laterally projecting leg 71 which is fitted into the bolt groove 72, FIGURE 5, formed by the cab sill 63 and is welded thereto. In a similar manner, an upstanding leg 73 of the casting 70 is welded in the lower end of the pillar 60. The front door pillar 60 and the header 62 are also secured together by a top pillar casting 80. The pillar casting 80 has a laterally projecting leg 81 which is welded to the top header and a depending leg 82 which is fitted within and welded to the front pillar 60. The rear door pillar 61 is welded to the header 62 and is connected to the cab sill portion 63b.

Both of the pillar castings 70, 80 are formed with projecting door hinge leaves 74, 84, respectively. These leaves 74, 84 are the cab leaves and are provided with tapped holes 75, 85, respectively. As will be described in greater detail, the cab leaves serve to mount the cab doors in an improved manner so that the doors can be easily fitted and adjusted in the openings defined by the door frames.

The front door pillars 60 are secured together by transversely extending members 90, 91, 92. The front panel 94, which mounts the grill 95 and headlights 96, is riveted to the members 91, 92 and to the front pillars, FIGURE 2. A windshield panel 97, FIGURES 2 and 3, which mounts the windshields 98, is riveted to the members 90, 92, and to the front pillars.

Braces 110, 111 are provided on the back of the frame structure 22 in association with each rear door pillar 61. As shown in FIGURE 3, each brace 110 is secured to an intermediate portion of a door pillar 61 and extends upwardly and rearwardly. The upper ends of the braces 110 are connected by a transverse structural member 112. The braces 111 are each secured to an intermediate portion of a door pillar 61 adjacent the brace 110 and extend downwardly and rearwardly to the cab sills 63. A support member 113 is connected across the braces 111 between their ends.

In assembly, the section 23 is fitted to the door frame structures 22 secured by rivets 100, FIGURES 4, 5, 7, and 8, to the rear door pillars 61, the top pillars 62, and the cab sill portions 63b. The upwardly and rearwardly extending braces 110 and the interconnecting member 112 serve to support the member 23 at the juncture of the roof 50 and back wall 51. The sub-assembly of the door frame structures 22 and the connected section 23 is mounted over the floor section 21 so that the cab sills 63 rest on the fenders 36 and the skirt panels 37. The frame structure 22 is then bolted in place on the floor section 21. The floor section 21 is in turn mounted over the cab support 20. As shown in FIGURE 1, the floor panel 35 projects between the support member 113 and the spacer 27, and these are secured together as by rivets 120. The front edge of the floor panel 35 is secured by rivets 105 to the underside of the lower member 91. The assembly of the shell of the cab body 10 is completed by riveting the front panels 94, 97 to the front pillars 60 and the members 90–92, as described above. After the shell is assembled, an instrument panel 150, FIGURE 1, is secured to and obscures the members 91, 92.

In accordance with this invention, doors 130 are provided which have upper and lower members 131, 132. The members 131, 132 are the door leaves of the hinges and carry hinge pins 133, FIGURE 6, having threaded projecting ends which are engageable in the tapped holes 75, 85 of the cab leaves 74, 84, respectively. With this preferred construction, the doors 130 can be vertically adjusted to fit the door openings of the frames 22 simply by adjusting the hinge pins in the cab leaves. Forward and rearward adjustment is obtained by adjustment of the door leaves 131, 132 and the doors 130.

With the seat and instrument panel in place and the door closed, most of the frame structure is obscured. That which is visible, specifically the pillars and the members 91, 110, and 112, are all designed to provide pleasing and unobtrusive appearance.

As will be apparent from the foregoing, the new and improved cab body construction of this invention is, apart from window and door structures, composed of only four sub-assembly units; namely, the floor section 21, the door frame structures 22, the roof and back section 23, and the front panel. Each sub-assembly unit is of a strong, lightweight, and relatively simple construction. At the same time, the sub-assembly units cooperate in such a manner that they can be easily and quickly connected with minimum effort and expense.

Although the invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:
1. A truck cab assembly for mounting on a chassis including a frame structure and road wheels, said assembly comprising:
  (a) a plurality of formed sections defining front, side, back, roof, floor, and fender portions;

(b) frame structure within said sections and both reinforcing and fixing said sections together to provide a cab shell having window and door apertures;
(c) doors and windows mounted in and closing said apertures to complete said cab; and,
(d) said frame structure being mounted on top of said floor section with portions of said floor section extending laterally outwardly past said frame structure and past the side portions whereby to shield the frame structure and a joint between the side portions and the frame structure.

2. The device of claim 1 wherein said formed sections are molded plastic members providing both internally and externally visible surfaces for said cab structure.

3. The device of claim 1 wherein certain of said formed sections define a plurality of said portions.

4. The device of claim 3 wherein the entire lower wall under body and the fenders are defined by a single section.

5. The device of claim 1 wherein there are three such formed sections, one of said sections forming the roof and back of the cab, a second of said sections forming the floor, the seat support, and the fenders of the cab, and the third section providing a front panel.

6. The device of claim 1 wherein said frame structure provides means to connect the formed sections together, means reinforcing the formed sections, and means providing door sill and pillar structures.

7. The device of claim 6 wherein said frame structure is formed metal sections and means connecting said metal sections together.

8. The device of claim 1 wherein one of the sections is a one piece molded member having:
(a) a substantially flat floor portion;
(b) an elevated seat supporting portion above and spaced rearwardly of the floor portion;
(c) frame structure receiving portions on either side of said floor and seat supporting portions for receiving the frame structure with the frame structure positioned above said one-piece molded member and forming door thresholds;
(d) first and second fender portions projecting outwardly on opposite sides of said floor and seat supporting portions with said first and second frame structure receiving portions respectively between the first and second fenders and the floor and seat portions; and,
(e) first and second skirt panel portions depending respectively from the thresholds forward of and connected to and reinforcing said fender portions.

9. A vehicle body construction comprising:
(a) a chassis;
(b) a cab support connected to said chassis, said cab support including side members, a front spacer connected between the forward ends of said side members, and a rear spacer connected between the rearward ends of said side members;
(c) a floor section engaged on said cab support, said floor section being a one-piece member including a floor panel, side skirts, and fenders;
(d) a pair of rigid door frame structures, each of said door frame structures including front and rear door pillars, a header bridging the upper ends of said door pillars, a sill connected to the bottom ends of said door pillars, and transverse members connected between said front door pillars;
(e) said sills being engaged on the upper surfaces of said side skirts and fenders in substantially the same plane as said floor panel;
(f) a one-piece member defining a roof and a back wall secured to said rear door pillars and to said sills;
(g) means securing said door frame structures and the rear edge portion of said floor panel to said spacers;
(h) means securing the front edge portion of said floor panel to one of said transverse members;
(i) front panels secured to said front door pillars and to said transverse members; and,
(j) doors mounted on each door frame structure.

10. The vehicle body construction as claimed in claim 9 wherein each of said door frame structures includes an upper and a lower door hinge leave, an upper and a lower leaf is carried by each of said doors, said upper and lower leaves being paired, upper and lower hinge pins are respectively carried by one of the upper and lower leaves, said pins are each adjustably engaged in the other leaf of a pair so that the positions of said doors can be vertically adjusted.

11. The vehicle body construction as claimed in claim 9 wherein the securing means of sub-paragraph (g) comprises an upwardly and rearwardly extending brace connected to an intermediate portion of each rear post and engaging said member forming the roof and tail wall, means connecting the upper ends of said braces, a downwardly and rearwardly extending brace connected between an intermediate portion of each rear door pillar and a sill, and a support member carried by said downwardly and rearwardly extending braces.

12. The vehicle body construction as claimed in claim 11 wherein the top end of each of said front pillars is connected to the header by a member having projecting legs, one of said legs being secured within the front door pillar and the other of said legs being secured to the top pillar, and wherein the bottom end of each front door pillar is secured to the sill by a member having legs secured within the front door pillar and the sill.

13. The device of claim 9 wherein the doors are mounted by hinges at the top and bottom of each front pillar.

14. A body panel for a truck comprising an integral, one piece molded member having:
(a) a substantially flat floor portion;
(b) an elevated seat supporting portion above and spaced rearwardly of the floor portion;
(c) frame structure receiving surfaces on either side of said floor and seat supporting portions for receiving frame structure positioned above said integrally formed member;
(d) first and second fender portions projecting outwardly on opposite sides of said floor and seat supporting portions with said first and second frame structure receiving surfaces respectively between the first and second fenders and the floor and seat portions; and,
(e) first and second skirt panel portions depending respectively from the first and second frame surfaces forward of and connected to and reinforcing said fender portions.

15. In combination with the body panel of claim 14, a frame structure mounted on top of said body panel, said frame structure defining door and window openings, a plurality of formed sections defining front, side, back and roof portions of a body shell and connected to said frame structure with said frame structure encased within said sections and said panel, and doors and windows closing said door and window openings respectively.

16. A vehicle body construction comprising:
(a) a chassis;
(b) a cab support connected to said chassis, said cab support including side members, and spacer means between and connected to said side members;
(c) a floor section engaged on said cab support, said floor section being a one-piece member including a floor panel, side skirts, and portions for overlying road wheels on a connected chassis;
(d) a pair of rigid door frame structures, each of said door frame structures including front and rear door pillars, a header bridging the upper ends of said door pillars, a sill connected to the bottom ends of said door pillars;
(e) transverse frame members between and connected to said door frame structures;

(f) said sills having upper surfaces in substantially the same plane as said floor panel;

(g) shell structure defining a deck and a back wall secured to said rear door pillars and to said sills;

(h) means securing said door frame structures and said floor section to said cab support;

(i) means securing said floor section to one of said transverse members;

(j) front panels secured to said front door pillars and to said transverse members; and, (k) doors mounted on each door frame structure.

17. A truck cab assembly for mounting on a chassis including a chassis frame and road wheels; said assembly comprising:

(a) a frame structure defining door and window openings;

(b) a plurality of molded sections including side portions, said sections being connected together by said frame structure to form a body shell and encase said frame structure, said frame structure being mounted on one of said sections, said one section including portions extending laterally outwardly of said frame structure and past the side portions whereby to shield the frame structure and a joint between the side portions and the frame structure;

(c) said shell including door and window openings aligned with said frame door and window openings; and, (d) doors and windows closing said openings whereby said frame structure is totally encased within said doors, windows and shell when the doors are closed.

18. The assembly of claim 17 wherein said frame structure includes a plurality of extruded metal members secured together.

19. The assembly of claim 18 wherein:

(a) certain of said extruded members form, as to each door opening, a header, a sill, and a door pillar; and, (b) a pair of hinge members at each door opening with one hinge member of each pair connecting the door pillar to the header and the other hinge member of each pair connecting the door pillar to the sill.

20. The assembly of claim 19 wherein said hinge members telescope into said header, sill, and door pillars, respectively.

21. The assembly of claim 18 wherein certain of said extruded members form headers for said door openings and each of said headers includes an outwardly projecting lip extending outwardly of said shell and forming a drip molding.

22. The assembly of claim 18 wherein certain of the extruded members form door sills, each including a gasket groove and a gasket in each groove.

References Cited

UNITED STATES PATENTS

| 1,644,826 | 10/1927 | Goodard | 296—28 |
| 2,086,529 | 7/1937 | Bontemps | 296—44 |
| 2,358,172 | 9/1944 | Lindsay | 296—28 |
| 2,511,460 | 6/1950 | Cancelli et al. | 296—102 |
| 2,637,592 | 5/1953 | Karlby | 296—28 |
| 3,055,699 | 9/1962 | May | 180—89 X |

FOREIGN PATENTS

| 954,462 | 12/1949 | France. |
| 1,137,219 | 1/1957 | France. |
| 245,032 | 10/1946 | Switzerland. |

LEO FRIAGLIA, *Primary Examiner.*

BENJAMIN HERSH, *Examiner.*

J. A. PEKAR, *Assistant Examiner.*